US011335186B2

United States Patent
Oishi et al.

(10) Patent No.: US 11,335,186 B2
(45) Date of Patent: May 17, 2022

(54) COMMUNICATION SYSTEM

(71) Applicant: HONDA MOTOR CO., LTD., Tokyo (JP)

(72) Inventors: Yasuo Oishi, Tokyo (JP); Atsuki Kakinuma, Tokyo (JP); Kazuya Matsuura, Tokyo (JP); Takeo Tokunaga, Tokyo (JP); Akira Iihoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 16/827,978

(22) Filed: Mar. 24, 2020

(65) Prior Publication Data

US 2020/0312125 A1 Oct. 1, 2020

(30) Foreign Application Priority Data

Mar. 26, 2019 (JP) .............................. JP2019-058598

(51) Int. Cl.
*G08G 1/01* (2006.01)
*H04W 4/46* (2018.01)
(Continued)

(52) U.S. Cl.
CPC ........... *G08G 1/0112* (2013.01); *G08G 1/056* (2013.01); *G08G 1/163* (2013.01); *H04W 4/46* (2018.02)

(58) Field of Classification Search
CPC .... G08G 1/0112; G08G 1/163; G08G 1/0116; G08G 1/164; G08G 1/052; G08G 1/056; H04W 4/46
See application file for complete search history.

(56) References Cited

U.S. PATENT DOCUMENTS 8,918,586 B1 * 12/2014 Todd ....................... G06F 12/08
 711/117
10,440,452 B2 * 10/2019 Mach ...................... H04W 4/38
(Continued)

FOREIGN PATENT DOCUMENTS

JP 2001-283381 A 10/2001
JP 2009-145186 A 7/2009
(Continued)

OTHER PUBLICATIONS

Office Action dated Jan. 5, 2021 issued over the corresponding Japanese Patent Application No. 2019-058598 with the English translation thereof.

(Continued)

*Primary Examiner* — Luis A Martinez Borrero
(74) *Attorney, Agent, or Firm* — Carrier Blackman & Associates, P.C.; Joseph P. Carrier; Jeffrey T. Gedeon

(57) ABSTRACT

A communication system includes an information acquisition unit that acquires information (road information), a type identifying unit that identifies the type of the information acquired by the information acquisition unit, a storage unit (vehicle storage unit, server storage unit) that stores relationship information that associates the type of the information with the transmission direction of the information, and a direction identifying unit that identifies the transmission direction of the information acquired by the information acquisition unit based on the identification result by the type identifying unit and the relationship information stored in the storage unit (vehicle storage unit, server storage unit).

3 Claims, 11 Drawing Sheets

(51) Int. Cl.
  *G08G 1/16* (2006.01)
  *G08G 1/056* (2006.01)

(56) References Cited

U.S. PATENT DOCUMENTS

| | | | |
|---|---|---|---|
| 11,044,192 B2* | 6/2021 | Kim | H04L 1/0059 |
| 2013/0268186 A1* | 10/2013 | Yamashiro | G08G 1/163 |
| | | | 701/300 |
| 2016/0154099 A1* | 6/2016 | Saito | G01S 7/412 |
| | | | 342/28 |
| 2016/0171789 A1* | 6/2016 | Moon | H04L 43/04 |
| | | | 709/224 |
| 2016/0357187 A1 | 12/2016 | Ansari | |
| 2017/0238270 A1* | 8/2017 | Shen | H04W 72/0446 |
| | | | 370/336 |
| 2018/0052230 A1* | 2/2018 | Hirai | G01S 13/931 |
| 2018/0196443 A1* | 7/2018 | Bai | H04W 4/023 |
| 2018/0227728 A1* | 8/2018 | Kim | H04B 7/022 |
| 2019/0025856 A1* | 1/2019 | Turato | H04W 4/46 |
| 2019/0053178 A1* | 2/2019 | Merwaday | H04W 4/46 |
| 2019/0066403 A1* | 2/2019 | Nagura | G07C 5/085 |
| 2019/0088125 A1* | 3/2019 | Park | G07C 5/008 |
| 2020/0003861 A1* | 1/2020 | Eriksson | G01S 19/48 |
| 2020/0076722 A1* | 3/2020 | Kim | H04W 76/16 |
| 2020/0120458 A1* | 4/2020 | Aldana | H04W 4/08 |
| 2020/0192603 A1* | 6/2020 | Tanriover | G06F 3/0659 |
| 2020/0204280 A1* | 6/2020 | Thagadur Shivappa | |
| | | | G01S 19/48 |

FOREIGN PATENT DOCUMENTS

| | | |
|---|---|---|
| JP | 2012-048748 A | 3/2012 |
| JP | 2018-077587 A | 5/2018 |
| JP | 2008-248653 A | 10/2018 |

OTHER PUBLICATIONS

Office Action dated Oct. 20, 2021 issued over the corresponding Indian Patent Application No. 202044012551.

* cited by examiner

FIG. 2

| (TYPE OF) ROAD INFORMATION 34 | DIRECTION INFORMATION 36 | TRAVEL DIRECTION INFORMATION 38 |
|---|---|---|
| HOLE IS PRESENT IN FIRST ROADWAY | REAR DIRECTION | SAME DIRECTION AS TRAVEL DIRECTION OF HOST VEHICLE |
| HOLE SPANNING FIRST ROADWAY AND SECOND ROADWAY IS PRESENT | FRONT DIRECTION, REAR DIRECTION | SAME DIRECTION AS OR OPPOSITE DIRECTION TO TRAVEL DIRECTION OF HOST VEHICLE |
| SECOND ROADWAY IS CONGESTED | FRONT DIRECTION (ON SECOND ROADWAY) | OPPOSITE DIRECTION TO TRAVEL DIRECTION OF HOST VEHICLE |
| PERSON IS PRESENT ON LEFT SIDE JUST BEFORE INTERSECTION | FRONT LEFT DIRECTION | DIRECTION INTERSECTING WITH FRONT-REAR DIRECTION OF HOST VEHICLE |
| PERSON IS PRESENT ON RIGHT SIDE JUST BEFORE INTERSECTION | FRONT RIGHT DIRECTION | DIRECTION INTERSECTING WITH FRONT-REAR DIRECTION OF HOST VEHICLE |
| .... | .... | .... |

32

COMMUNICATION SYSTEM

CROSS-REFERENCE TO RELATED APPLICATION

This application is based upon and claims the benefit of priority from Japanese Patent Application No. 2019-058598 filed on Mar. 26, 2019, the contents of which are incorporated herein by reference.

BACKGROUND OF THE INVENTION

Field of the Invention

The present invention relates to a communication system that transmits information acquired on a road to another system.

Description of the Related Art

As disclosed in, for example, Japanese Laid-Open Patent Publication No. 2001-283381, an inter-vehicle communication system that shares information via communication between vehicles has been developed. This system eliminates the need to provide equipment (facilities) for vehicle-to-road communication on a low-traffic road or the like. This reduces the cost for providing the equipment.

SUMMARY OF THE INVENTION

In the system disclosed in Japanese Laid-Open Patent Publication No. 2001-283381, information is exchanged between vehicles. Such information may include unnecessary information. For example, after the first vehicle passes through a certain point, the second vehicle may transmit the information of this point to the first vehicle. The first vehicle does not need this information. However, the first vehicle having received this information processes the information. As described above, when vehicles acquire information from surrounding vehicles constantly, computation loads become high.

The present invention considers such a problem with an object of providing a communication system capable of reducing computation loads on the device on the reception side.

According to an aspect of the present invention, there is provided a communication system including: an information acquisition unit configured to acquire information; a type identifying unit configured to identify a type of the information acquired by the information acquisition unit; a storage unit configured to store relationship information that associates the type of the information with a transmission direction of the information; and a direction identifying unit configured to identify the transmission direction of the information acquired by the information acquisition unit, based on an identification result by the type identifying unit and the relationship information stored in the storage unit.

The present invention reduces computation loads on the device on the reception side.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a schematic view used to describe relationship information;

DESCRIPTION OF THE PREFERRED EMBODIMENTS

Preferred embodiments of a communication system according to the present invention will be described in details below with reference to the attached drawings.

1. First Embodiment

[1.1. Structure]

Figure 1:
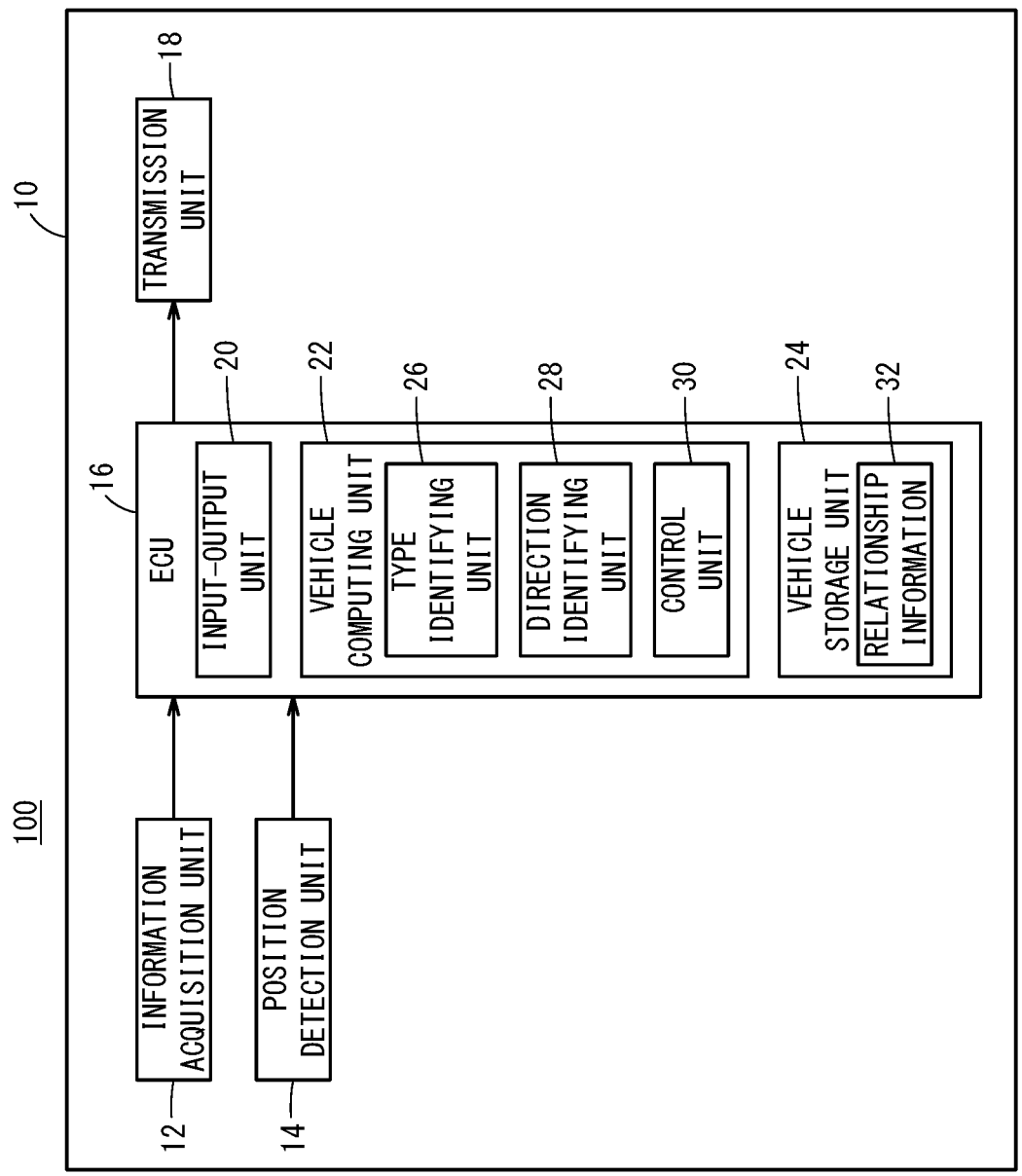
FIG. 1 is a structural diagram illustrating a communication system according to a first embodiment.

The structure of a communication system 100 according to a first embodiment will be described with reference to FIG. 1. In the first embodiment, components of the communication system 100 are provided in a host vehicle 10. The host vehicle 10 includes an information acquisition unit 12, a position detection unit 14, an ECU 16, and a transmission unit 18.

The information acquisition unit 12 includes, for example, one or more cameras and acquires information (outer angle information) around the host vehicle 10. The information acquisition unit 12 outputs the acquired information to the ECU 16. The position detection unit 14 is a navigation apparatus including, for example, map information, a GNSS module, an acceleration sensor, a gyro sensor, and the like and detects the position of the host vehicle 10 using at least one of satellite navigation and inertia navigation. The position detection unit 14 outputs the detected information to the ECU 16.

The ECU 16 includes an input-output unit 20, a vehicle computing unit 22, and a vehicle storage unit 24. The input-output unit 20 includes an A/D conversion circuit, a communication interface, a driver, and the like. The vehicle computing unit 22 is configured by a processor including, for example, a CPU and the like. The vehicle computing unit 22 achieves various functions by executing programs stored in the vehicle storage unit 24. Here, the vehicle computing unit 22 functions as a type identifying unit 26, a direction identifying unit 28, and a control unit 30. The type identifying unit 26 identifies the type of information acquired by the information acquisition unit 12. The information acquired by the information acquisition unit 12 is referred to as road information 34 (FIG. 2). The types of the road information 34 are classified according to the road conditions indicated by the road information 34. The direction identifying unit 28 identifies the transmission direction of the information (road information 34) acquired by the information acquisition unit 12 based on the identification result by the type identifying unit 26 and relationship information 32 stored in the vehicle storage unit 24. The control unit 30 controls the transmission unit 18 to transmit the information (road information 34) acquired by the information acquisition unit 12 at least in the transmission direction identified by the direction identifying unit 28. In addition, the control unit 30 centrally manages the communication system 100 provided in the host vehicle 10. The vehicle storage unit 24 includes a RAM, a ROM, and the like. The vehicle storage unit 24 stores various programs, various types of information used in the processing performed by the vehicle computing unit 22, and the relationship information 32 (FIG. 2).

The transmission unit 18 has a transmitter and an antenna that are used for inter-vehicle communication. The antenna is a variable directional antenna capable of switching the transmission direction of radio waves. A variable directional antenna has less amounts of consumption of electric power concerning transmission than a nondirectional antenna.

As illustrated in FIG. 2, the relationship information 32 associates, with each other, the road information 34, direction information 36 indicating the transmission direction of the road information 34, and travel direction information 38 indicating the relative travel direction of a reception device (other vehicle 40) with respect to the host vehicle 10. The information of one or more directions is associated with the road information 34 as the direction information 36. In addition, the information of one or more travel directions is associated with the road information 34 as the travel direction information 38. The types of the road information 34 are determined in advance.

For example, the types of the road information 34 determined in advance include "hole 54 is present in first roadway 44", "hole 54 spanning first roadway 44 and second roadway 46 is present", "second roadway 46 is congested", "person 58*a* is present on left side just before intersection 56", "person 58*b* is present on right side just before intersection 56", and the like.

For example, the direction information 36 determined in advance includes "front direction", "rear direction", "right direction", "left direction", "front right direction", "front left direction", "rear right direction", "rear left direction", and the like. The directions determined as the direction information 36 may assume that the host vehicle 10 travels in the front direction. For example, when the host vehicle 10 travels forward, the side on which the headlights (not illustrated) of the host vehicle 10 are provided may be regarded as the "front direction". When the host vehicle 10 travels backward, the side on which the tail lamps (not illustrated) of the host vehicle 10 are provided may be regarded as the "front direction". Instead, the directions determined as the direction information 36 may assume that the side on which the headlights of the host vehicle 10 are provided as seen from the host vehicle 10 corresponds to the "front direction" and the side on which the tail lamps are provided corresponds to the "rear direction". In the following description, the direction information 36 assumes that the travel direction of the host vehicle 10 is regarded as the front direction.

For example, the travel direction information 38 determined in advance includes "direction same as travel direction of host vehicle 10", "direction opposite to travel direction of host vehicle 10", "direction intersecting with front-rear direction of host vehicle 10", and the like.

Figure 3:
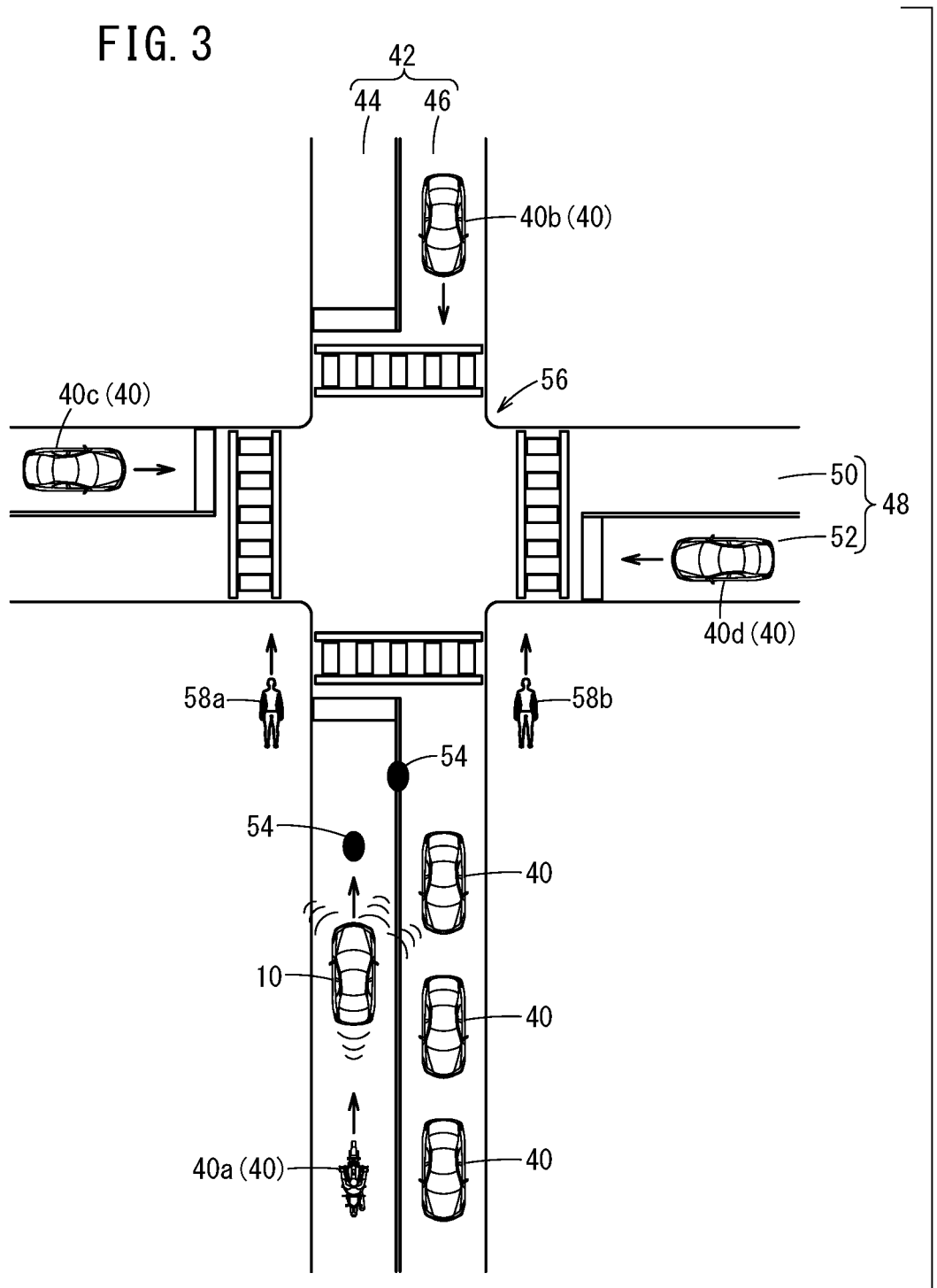
FIG. 3 is a schematic view illustrating road conditions.

The road information 34 and the direction information 36 illustrated in FIG. 2 are associated with each other based on the viewpoint described below. Here, various road conditions as illustrated in FIG. 3 are assumed. In the area assumed in FIG. 3, a first road 42 intersects with a second road 48. The first road 42 includes a first roadway 44 and a second roadway 46 with travel directions opposite to each other. The second road 48 includes a third roadway 50 and a fourth roadway 52 with travel directions opposite to each other. The host vehicle 10 travels on the first roadway 44 before an intersection 56.

When a hole 54 is present in the first roadway 44, the information "hole 54 is present in first roadway 44" is useful for the vehicle that travels on the first roadway 44 and does not yet reach the position of the hole 54, that is, another vehicle 40*a* that travels behind the host vehicle 10. Accordingly, as illustrated in FIG. 2, the direction information 36 "rear direction" is associated with this type of road information 34.

When the hole 54 spanning the first roadway 44 and the second roadway 46 is present, the information "hole 54 spanning first roadway 44 and second roadway 46 is present" is useful for the other vehicle 40*a* that travels behind the host vehicle 10 and another vehicle 40*b* that travels on the second roadway 46 in front of the host vehicle 10. Accordingly, as illustrated in FIG. 2, the direction information 36 "front direction" and the direction information 36 "rear direction" are associated with this type of road information 34.

When the second roadway 46 is congested, the information "second roadway 46 is congested" is useful for the vehicle that travels on the second roadway 46 and does not yet reach the backend of the congestion, that is, the other vehicle 40*b* that travels on the second roadway 46 in front of the host vehicle 10. Accordingly, as illustrated in FIG. 2, the direction information 36 "front direction (on second roadway 46)" is associated with this type of road information 34.

When the person 58*a* is present on the left side just before the intersection 56 as seen from the host vehicle 10 that travels toward the intersection 56, this person 58*a* may cross the second road 48. The information "person 58*a* is present on left side just before intersection 56 (as seen from host vehicle 10)" is useful for another vehicle 40*c* that travels toward the intersection 56 from the left side as seen from the host vehicle 10. Accordingly, as illustrated in FIG. 2, the direction information 36 "front left direction" is associated with this type of road information 34.

When the person 58*b* is present on the right side just before the intersection 56 as seen from the host vehicle 10 that travels toward the intersection 56, this person 58*b* may cross the second road 48. The information "person 58*b* is present on right side just before intersection 56 (as seen from host vehicle 10)" is useful for another vehicle 40*d* that travels toward the intersection 56 from the right side as seen from the host vehicle 10. Accordingly, as illustrated in FIG. 2, the direction information 36 "front right direction" is associated with this type of road information 34.

[1.2. Processing]

Figure 4:
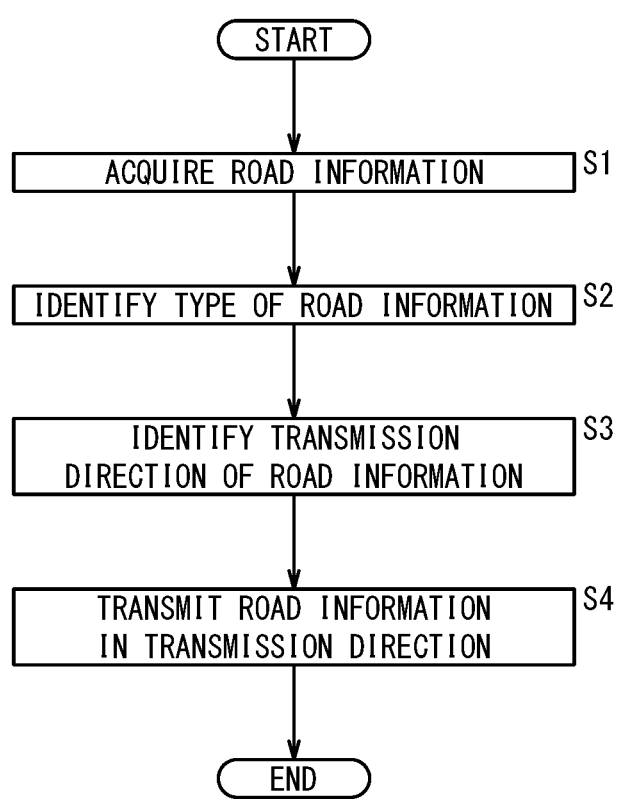
FIG. 4 is a flowchart illustrating processing performed by the communication system according to the first embodiment.

The processing performed by the communication system 100 according to the first embodiment will be described with reference to FIG. 4. A series of processes described below is performed every predetermined time. In the embodiments described below, the information acquisition unit 12 is assumed to be a camera that captures an image in front of the host vehicle 10.

In step S1, the information acquisition unit 12 acquires, as the road information 34, image information acquired by capturing the surroundings of the host vehicle 10. In addition, the position detection unit 14 detects the position of the host vehicle 10 at a time when the image has been captured. Upon completion of step S1, the processing proceeds to step S2.

In step S2, the type identifying unit 26 identifies the type of the road information 34 included in the image information. For example, the type identifying unit 26 recognizes the target object included in the image information and the relative position of the target object, determines whether the condition of the target object belongs to any type of the road information 34 included in the relationship information 32 based on the recognition result, and identifies the type of the road information 34. Upon completion of step S2, the processing proceeds to step S3.

In step S3, the direction identifying unit 28 identifies the direction information 36 associated with the road information 34 identified in step S2 based on the relationship information 32, and identifies the direction indicated by the direction information 36 as the transmission direction. Upon completion of step S3, the processing proceeds to step S4.

In step S4, the control unit 30 controls the transmission unit 18 to transmit the road information 34 (image information) acquired in step S1 and the location information of the host vehicle 10 in the transmission direction identified in step S3.

[1.3. Modification of First Embodiment]

In the first embodiment, the transmission unit 18 has a variable directional antenna. Instead, the transmission unit 18 may have a directional antenna and an adjustment mechanism for adjusting the posture of the directional antenna. A directional antenna can also be used to reduce the amount of consumption of electric power as a variable directional antenna. This is true of the other embodiments described below.

Alternatively, the transmission unit 18 may have a non-directional antenna instead of a directional antenna. In this case, when the control unit 30 controls the transmission unit 18 to transmit the road information 34 and the location information of the host vehicle 10, the control unit 30 also causes the transmission unit 18 to transmit the information of the transmission direction identified in step S3 together. The other vehicle 40 selects the road information 34 based on the location information of the other vehicle 40, the received location information of the host vehicle 10, and the received information of the transmission direction. This is true of the other embodiments described below.

2. Second Embodiment

[2.1. Structure]

Figure 5:
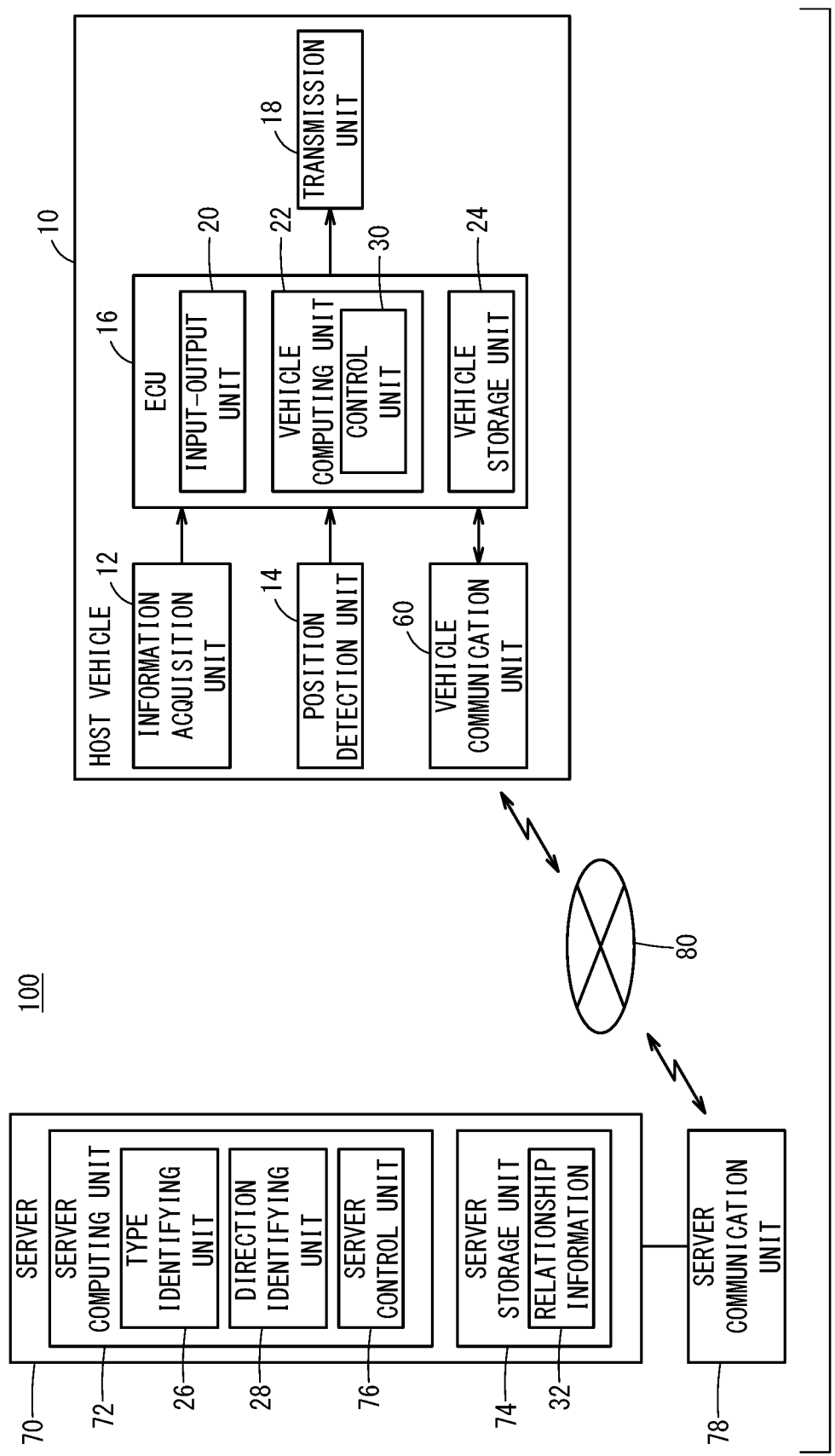
FIG. 5 is a structural diagram illustrating a communication system according to a second embodiment.

The structure of a communication system 100 according to a second embodiment will be described with reference to FIG. 5. In the description of the second embodiment, the same components as in the first embodiment are denoted by the same reference numerals and detailed descriptions thereof are omitted. In the second embodiment, the components of the communication system 100 are provided in either the host vehicle 10 or a server 70. A roadside machine may be used in place of the server 70.

The host vehicle 10 includes a vehicle communication unit 60 in addition to the information acquisition unit 12, the position detection unit 14, the ECU 16, and the transmission unit 18. The vehicle communication unit 60 transmits the information generated by the vehicle computing unit 22 or the information stored in the vehicle storage unit 24 to a server communication unit 78 via a public line 80, or receives the information transmitted from the server communication unit 78 via the public line 80 and outputs the received information to the vehicle computing unit 22 or the vehicle storage unit 24.

The server 70 is a computer and includes a server computing unit 72 and a server storage unit 74. The server computing unit 72 is configured by a processor including, for example, a CPU. The server computing unit 72 achieves various functions by executing programs stored in the server storage unit 74. Here, the server computing unit 72 functions as the type identifying unit 26, the direction identifying unit 28, and a server control unit 76. The server control unit 76 centrally manages the processing performed by the server 70. The server storage unit 74 includes a RAM, a ROM, and the like. The server storage unit 74 stores various programs, various types of information used in the processing performed by the server computing unit 72, and the relationship information 32 (FIG. 2). The server communication unit 78 transmits the information generated by the server computing unit 72 or the information stored in the server storage unit 74 to the vehicle communication unit 60 via the public line 80. In addition, the server communication unit 78 receives the information transmitted by the vehicle communication unit 60 via the public line 80 and outputs the received information to the server computing unit 72 or the server storage unit 74.

[2.2. Processing]

The processing performed by the communication system 100 according to the second embodiment is substantially the same as the processing (FIG. 4) performed by the communication system 100 according to the first embodiment. The difference is that the processing is performed only by the host vehicle 10 in the first embodiment, but the processing is performed by the host vehicle 10 and the server 70 in a distributed manner in the second embodiment. In the second embodiment, the processing in step S1 and step S4 is performed by the host vehicle 10 and the processing in step S2 and step S3 is performed by the server 70. When the processing proceeds to step S2 from step S1, the image information (road information 34) captured by the information acquisition unit 12 of the host vehicle 10 is transmitted from the vehicle communication unit 60 to the server communication unit 78. In addition, when the processing proceeds to step S4 from step S3, the information (direction information 36) of the transmission direction identified by the direction identifying unit 28 of the server 70 is transmitted from the server communication unit 78 to the vehicle communication unit 60.

[2.3. Modification of the Second Embodiment]

In the second embodiment, the vehicle computing unit 22 functions as the control unit 30 and the server computing unit 72 functions as the type identifying unit 26 and the direction identifying unit 28. Alternatively, the vehicle computing unit 22 may function as the type identifying unit 26 and the control unit 30 and the server computing unit 72 may function as the direction identifying unit 28. In this case, the information identified by the type identifying unit 26 of the host vehicle 10 is transmitted from the vehicle communication unit 60 to the server communication unit 78. Alternatively, the vehicle computing unit 22 may function as the direction identifying unit 28 and the control unit 30 and the server computing unit 72 may function as the type identifying unit 26. In this case, the information identified by the type identifying unit 26 of the server 70 is transmitted from the server communication unit 78 to the vehicle communication unit 60. This is true of the other embodiments in which the server 70 is used.

3. Third Embodiment

[3.1. Structure]

Figure 6:
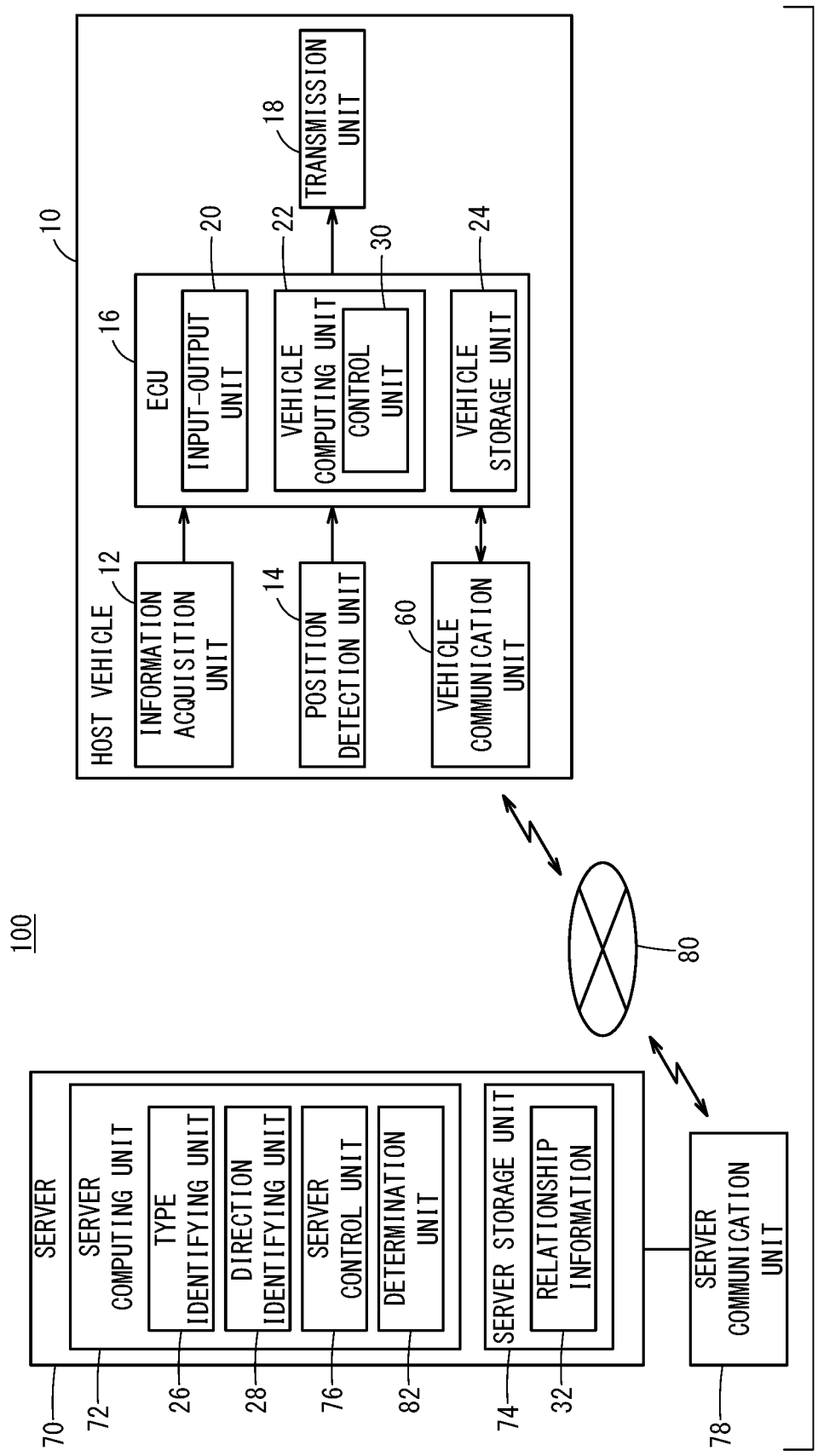
FIG. 6 is a structural diagram illustrating a communication system according to a third embodiment.

The structure of a communication system 100 according to a third embodiment will be described with reference to FIG. 6. In the description of the third embodiment, the same components as in the first and second embodiments are denoted by the same reference numerals and detailed descriptions thereof are omitted. The third embodiment further has functions in addition to the functions of the second embodiment.

In the third embodiment, it is assumed that the vehicles (host vehicle 10 and other vehicle 40) that travel on a road transmit probe information to the server 70 via the public line 80 at regular intervals. The probe information used in the third embodiment includes behavior information such as the position, the travel speed, and the travel direction of a vehicle and further includes equipment information representing the equipment provided for the vehicle. The equipment information includes information about the presence or absence of a reception device, the transmission capability of the transmission unit 18, and the like. The reception device receives information transmitted from the transmission units 18 of the vehicles (host vehicle 10 and other vehicle 40).

The server computing unit 72 functions as the type identifying unit 26, the direction identifying unit 28, the server control unit 76, and a determination unit 82. The determination unit 82 determines whether a reception device is present in the transmission direction identified by the direction identifying unit 28. In addition, the determination unit 82 determines the travel direction of the reception device.

[3.2. Processing]

Figure 7:
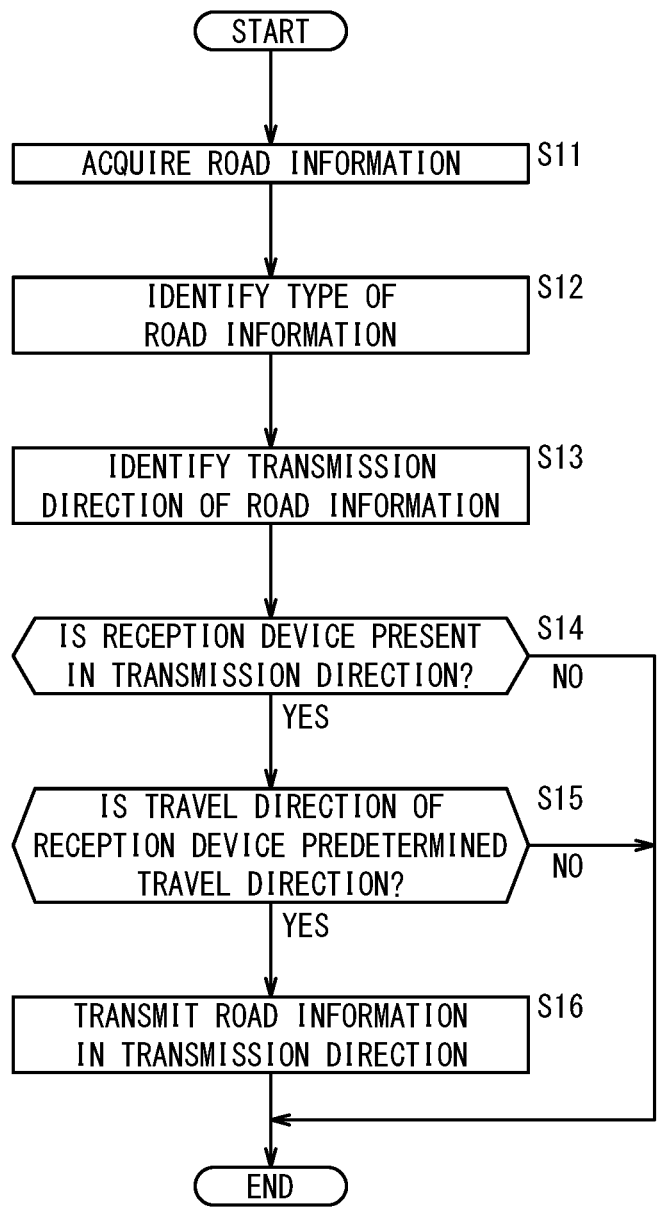
FIG. 7 is a flowchart illustrating processing performed by the communication system according to the third embodiment.
Figure 8:
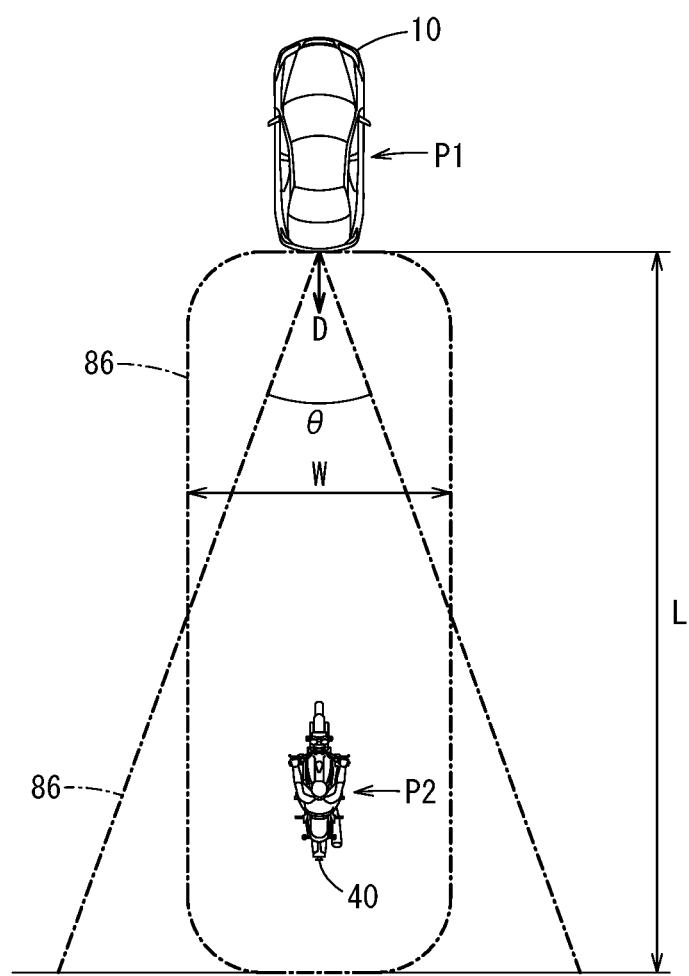
FIG. 8 is a schematic view used to describe the processing performed in the third embodiment.

The processing performed by the communication system 100 according to the third embodiment will be described with reference to FIGS. 7 and 8. The processing in steps S11 to S13 and S16 performed in the third embodiment is the same as the processing (FIG. 4) in steps S1 to S4 performed in the first embodiment. Here, the processing in steps S14 and S15 specific to the third embodiment will be described.

In step S14, the determination unit 82 determines whether a reception device is present in the transmission direction (direction D) identified in step S13. At this time, the determination unit 82 recognizes a position P1 of the host vehicle 10 based on the probe information of the host vehicle 10, and recognizes a position P2 of the other vehicle 40 and the presence or absence of the reception device based on the probe information of the other vehicle 40. Then, the determination unit 82 determines whether the position P2 is present in the direction D from the base point (i.e., position P1). At this time, the determination unit 82 may set a transmission range 86 (width W or angular width θ and distance L) from the base point (position P1). The determination unit 82 may set the transmission range 86 using the information concerning the transmission capability included in the probe information or a preidentified range.

In step S14, when the reception device of the other vehicle 40 is present in the transmission direction (YES in step S14), the process proceeds to step S15. When the reception device of the other vehicle 40 is not present in the transmission direction (NO in step S14), the processing ends. In this case, the transmission unit 18 does not transmit the road information 34 (image information).

In step S15, the determination unit 82 determines whether the travel direction of the reception device (other vehicle 40) is a predetermined travel direction. At this time, the determination unit 82 determines the travel direction of the other vehicle 40 based on the information concerning the travel direction included in the probe information of the other vehicle 40. Alternatively, the determination unit 82 may determine the travel direction of the other vehicle 40 by detecting the displacement direction of the other vehicle 40 based on the location information included in the probe information of the other vehicle 40. In addition, the determination unit 82 identifies the travel direction information 38 associated with the road information 34 specified in step S12, based on the relationship information 32. Then, the determination unit 82 compares the determined travel direction of the reception device (other vehicle 40) with a predetermined travel direction indicated by the travel direction information 38.

In step S15, when these directions coincide with each other, that is, the travel direction of the reception device is the predetermined travel direction (YES in step S15), the processing proceeds to step S16. In contrast, when these directions do not coincide, that is, the travel direction of the reception device is not the predetermined travel direction (NO in step S15), the processing ends. In this case, the transmission unit 18 does not transmit the road information 34 (image information).

[3.3. Modification of the Third Embodiment]

In the third embodiment, the processing in step S15 may be omitted.

4. Fourth Embodiment

[4.1. Structure]

Figure 9:
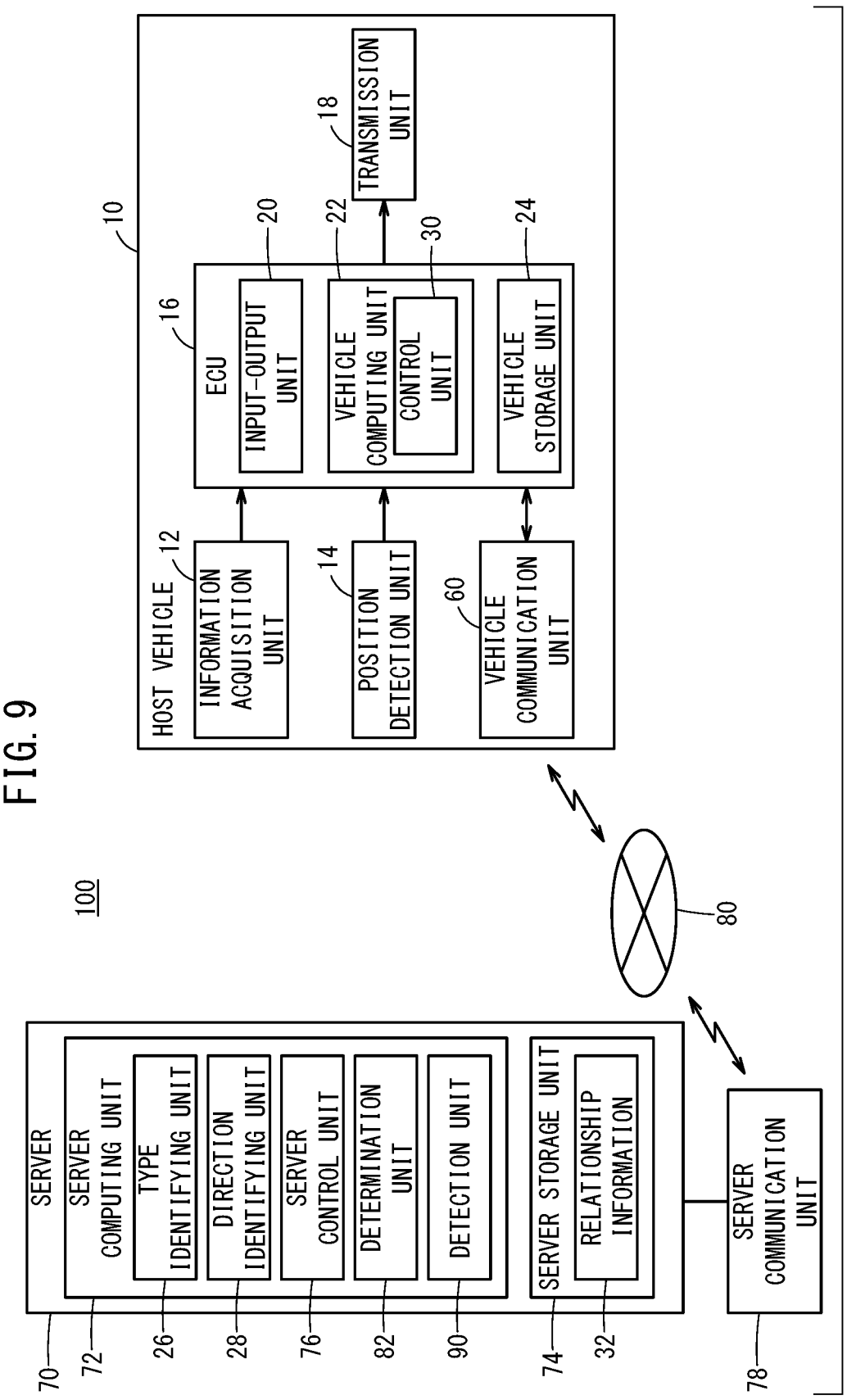
FIG. 9 is a structural diagram illustrating a communication system according to a fourth embodiment.

The structure of a communication system 100 according to a fourth embodiment will be described with reference to FIG. 9. In the description of the fourth embodiment, the same components as in the first to third embodiments are denoted by the same reference numerals and detailed descriptions thereof are omitted. The fourth embodiment further has functions in addition to the functions of the third embodiment.

The server computing unit 72 functions as the type identifying unit 26, the direction identifying unit 28, the server control unit 76, the determination unit 82, and a detection unit 90. The detection unit 90 detects the time in which communication with the reception device of the other vehicle 40 is enabled.

[4.2. Processing]

Figure 10:
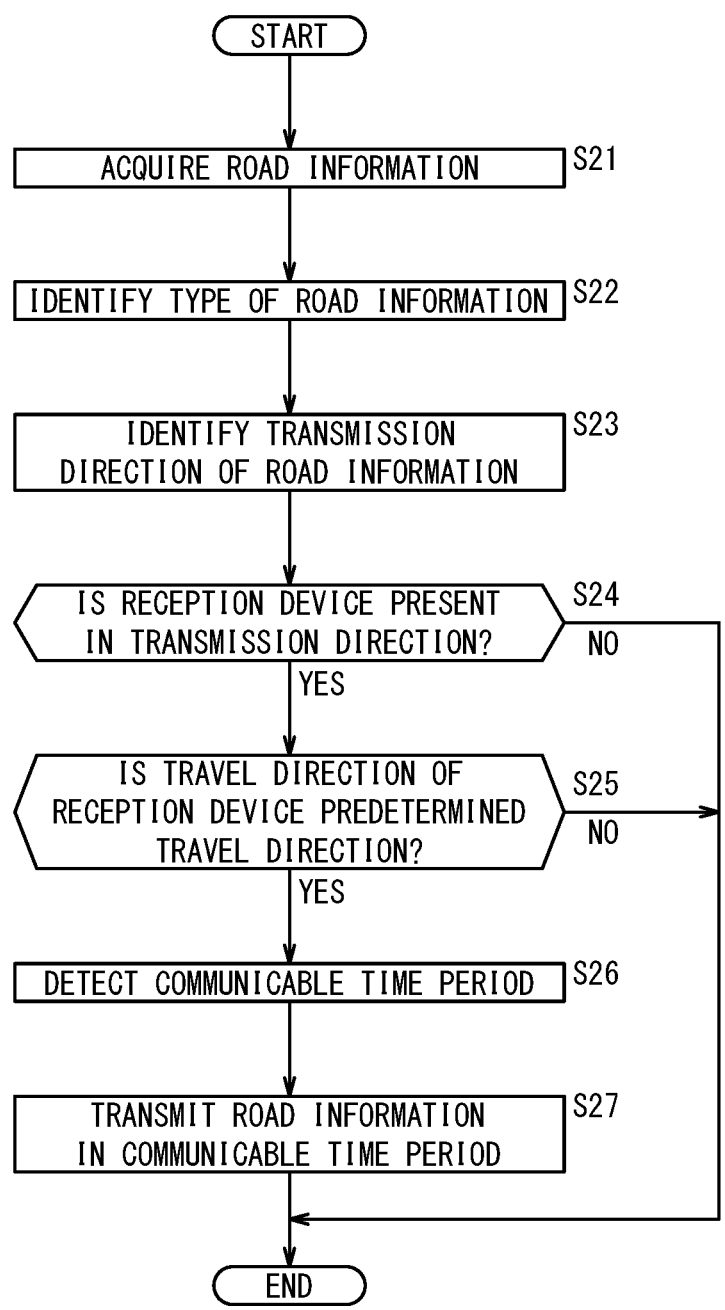
FIG. 10 is a flowchart illustrating processing performed by the communication system according to the fourth embodiment.
Figure 11:
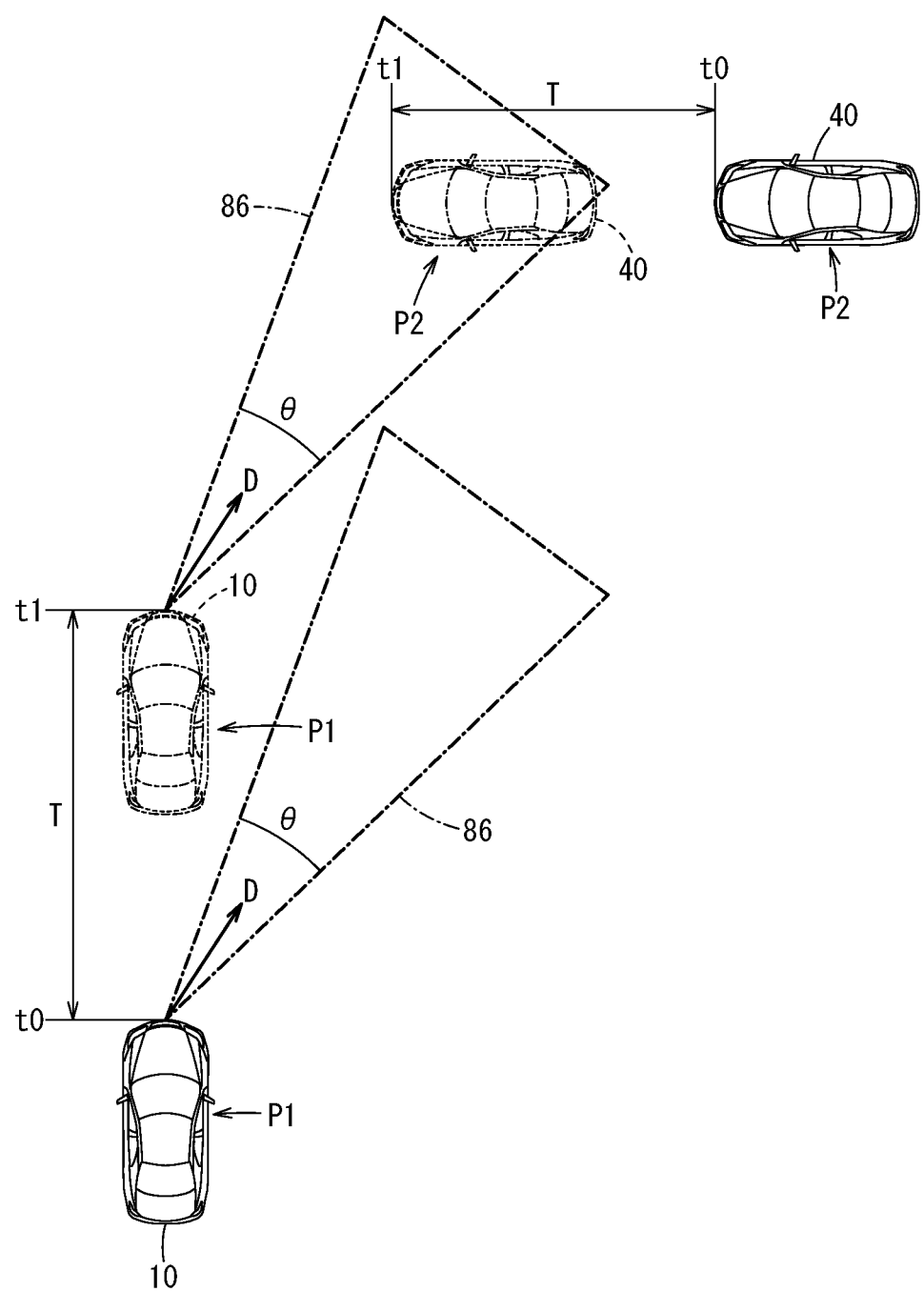
FIG. 11 is a diagram used to describe the processing performed in the fourth embodiment.

The processing performed by the communication system 100 according to the fourth embodiment will be described with reference to FIGS. 10 and 11. The processing in steps S21 to S25 performed in the fourth embodiment is the same as the processing (FIG. 7) in steps S11 to S15 performed in the third embodiment. Here, the processing in steps S26 and S27 specific to the fourth embodiment will be described.

When the processing proceeds to step S26 from step S25, the detection unit 90 detects (predicts) a communicable time period (i.e., a time period during which communication is enabled). At this time, the detection unit 90 predicts the position P1 of the host vehicle 10 and the position P2 of the other vehicle 40 at time t1, i.e., at a time when a lapse time T has passed since the present time t0, based on the probe information. The detection unit 90 assumes a plurality of lapse times T, predicts the position P1 of the host vehicle 10 and the position P2 of the other vehicle 40 for each lapse time T, and determines whether the position P2 is present in the direction D (or within the transmission range 86) from the base point (position P1). Then, the detection unit 90 detects (predicts) a time period during which the reception device is present in the transmission direction, as the communicable time period. The detection unit 90 performs the processing described above for each of the other vehicles 40 and for each piece of road information 34 to be transmitted (for each transmission direction D). The information concerning the communicable time period is transmitted to the control unit 30 together with the information concerning the direction D. Upon completion of step S26, the processing proceeds to step S27.

In step S27, the control unit 30 controls the transmission unit 18 to transmit the road information 34 (image information) and the location information of the host vehicle 10 acquired in step S21 in the transmission direction identified in step S23 when the time period (communicable time period) detected in step S26 has been reached.

5. Technical Concept Acquired in the Embodiments

The technical concept acquired by the embodiments described above will be described below.

According to an aspect of the present invention, there is provided the communication system 100 including: the information acquisition unit 12 configured to acquire information (road information 34); the type identifying unit 26 configured to identify a type of the information (road information 34) acquired by the information acquisition unit 12; the storage unit (vehicle storage unit 24, server storage unit 74) configured to store the relationship information 32 that associates the type of the information (road information 34) with a transmission direction of the information (road information 34); and the direction identifying unit 28 configured to identify the transmission direction of the information (road information 34) acquired by the information acquisition unit 12, based on an identification result by the type identifying unit 26 and the relationship information 32 stored in the storage unit (vehicle storage unit 24, server storage unit 74).

In the structure described above, since the direction identifying unit 28 identifies the transmission direction of the information (road information 34), the computing device (the computing device of the other vehicle 40) on the reception side does not need to process unnecessary information (road information 34). Accordingly, computation loads on the device on the reception side are reduced.

The communication system 100 according to an aspect of the present invention may further include: the transmission unit 18 configured to transmit the information; and the control unit 30 configured to control the transmission unit 18 to transmit the information (road information 34) acquired by the information acquisition unit 12 at least in the transmission direction identified by the direction identifying unit 28.

In the structure described above, since the control unit 30 instructs the transmission of the information (road information 34) in the identified transmission direction, the computing device (the computing device of the other vehicle 40) on the reception side does not need to process unnecessary information. Accordingly, computation loads on the device on the reception side are reduced.

The communication system 100 according to an aspect of the present invention may further include the determination unit 82 configured to determine whether a reception device is present in the transmission direction identified by the direction identifying unit 28, and the control unit 30 may control the transmission unit 18 to transmit the information (road information 34) acquired by the information acquisition unit 12 when the determination unit 82 determines that the reception device is present.

In the structure described above, when the reception device of the other vehicle 40 is present in the transmission direction, the control unit 30 instructs the transmission of the information (road information 34). That is, when the reception device of the other vehicle 40 is not present in the transmission direction, the control unit 30 does not instruct the transmission of the information (road information 34). Accordingly, the amount of consumption of electric power concerning transmission can be reduced.

The communication system 100 according to an aspect of the present invention may further include the determination unit 82 configured to determine whether a reception device is present in the transmission direction identified by the direction identifying unit 28 and determine whether the reception device is traveling in a predetermined travel direction corresponding to the information, and the control unit 30 may control the transmission unit 18 to transmit the information (road information 34) acquired by the information acquisition unit 12 when the determination unit 82 determines that the reception device is present.

The communication system 100 according to an aspect of the present invention may further include the detection unit 90 configured to detect a time period during which communication with the reception device is enabled, and the control unit 30 may control the transmission unit 18 to transmit the information (road information 34) acquired by the information acquisition unit 12 at the time period detected by the detection unit 90.

In the structure described above, since the control unit 30 instructs the transmission of the information (road information 34) in the time period in which the information can be transmitted, the reception side can receive the information with high probability. In addition, when communication is disabled, the control unit 30 does not instruct the transmission of the information (road information 34). Accordingly, the amount of consumption of electric power concerning transmission can be reduced.

The communication system according to the present invention is not limited to the embodiments described above and it will be appreciated that various structures can be adopted without departing from the concept of the present invention.

What is claimed is:

1. A communication system comprising a host vehicle and a server, wherein:
the host vehicle includes: a camera; a first processor; a variable directional antenna; and a transmitter, and
the server includes: a second processor; and a memory
the camera is configured to acquire an image of a road as road information;
the memory stores relationship information that associates types of the road information with transmission directions of the road information in advance;
the second processors is configured to:
acquire the road information from the host vehicle;
identify a type of the road information based on the image included in the road information;
identify a transmission direction of the road information from the host vehicle, based on the identified type of the road information and the relationship information stored in the memory; and
determine whether a reception device is present in the identified transmission direction, based on vehicular equipment information about presence or absence of the reception device and vehicular position information transmitted from each of a plurality of vehicles other than the host vehicle, and wherein the first processor is configured to:
  acquire information about the transmission direction from the server; and
  utilize the transmitter and the variable directional antenna to transmit the road information in the transmission direction when the second processor determines that the reception device is present in the transmission direction.

2. The communication system according to claim 1,
wherein the second processor is configured to detect a time period during which communication with the reception device is enabled, and wherein
the first processor controls the transmitter to transmit the road information at the time period detected by the second processor.

3. The communication system according to claim 1, wherein
the plurality of vehicles transmit to the server probe information including the vehicular position information and the vehicular equipment information.

\* \* \* \* \*